Figure 1:
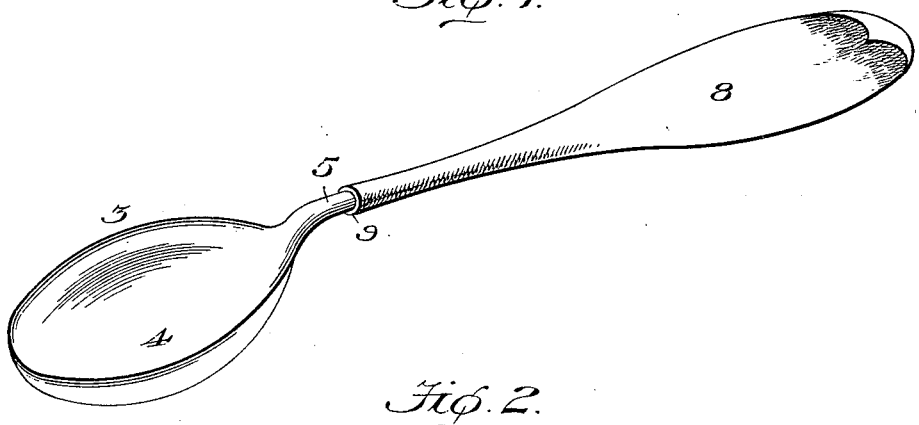

No. 659,341. Patented Oct. 9, 1900.
W. H. DODD & J. F. GREER.
SELF LEVELING SPOON.
(Application filed July 12, 1900.)

(No Model.)

Witnesses
E. J. Pullman
S. C. Brown

Inventors,
Joseph Francis Greer
William H. Dodd
By Ennis & Co.
Attorneys

UNITED STATES PATENT OFFICE.

WILLIAM HOPPER DODD AND JOSEPH FRANCIS GREER, OF MONTCLAIR, NEW JERSEY.

SELF-LEVELING SPOON.

SPECIFICATION forming part of Letters Patent No. 659,341, dated October 9, 1900.

Application filed July 12, 1900. Serial No. 23,406. (No model.)

*To all whom it may concern:*

Be it known that we, WILLIAM HOPPER DODD and JOSEPH FRANCIS GREER, citizens of the United States, residing at Montclair, in the county of Essex and State of New Jersey, have invented certain new and useful Improvements in Self-Leveling Spoons; and we do declare the following to be a full, clear, and exact description of the invention, such as will enable others skilled in the art to which it appertains to make and use the same.

Our invention relates to certain novel improvements in self-leveling spoons, and the object is to provide a spoon so constructed that the bowl will maintain a level position without regard to the position of the handle.

To this end the invention consists in the construction, combination, and arrangement of the several elements of the device, as will hereinafter be more fully described, and particularly pointed out in the claims.

In the accompanying drawings the same reference characters indicate the same parts of the invention.

Figure 2:
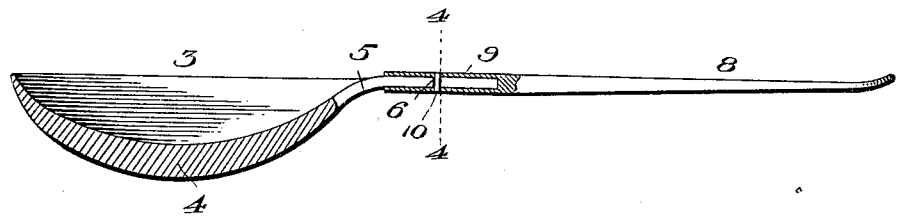
Figure 3:
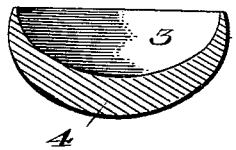
Figure 4:
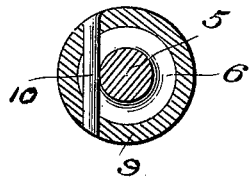

Figure 1 is a perspective view of our self-leveling spoon. Fig. 2 is a longitudinal section through the bowl and handle. Fig. 3 is a transverse section through the bowl. Fig. 4 is a similar view on the line 4 4 of Fig. 2.

The numeral 3 denotes the bowl, the bottom portion 4 of which is formed somewhat thicker than the sides, and it is provided with an integral cylindrical shank 5, formed with a circumferential groove 6 about midway of its length.

The handle 8 may be of any approved form, shape, or style, and its inner end is formed with a cylindrical socket 9 to receive the correspondingly-formed shank 5, which has a free axial movement in the handle. A pin 10 is inserted in the handle in line with the groove 6 in the shank to prevent the shank and handle becoming separated, but which in no way interferes with their free axial movement with respect to each other. When the handle is held in the hand in the act of manipulating the spoon, the bowl maintains a level position by reason of its weighted-bottom portion, the many advantages of which are sufficiently obvious without further description.

In the present drawings we have shown our invention in the best form now known to us; but various changes in the details of connecting the bowl and handle may be made without departing from the spirit of our invention.

Having thus fully described our invention, what we claim as new and useful, and desire to secure by Letters Patent of the United States, is—

1. The combination with the weighted bowl, formed with the cylindrical shank, of the handle formed with the socket to receive said shank, as and for the purpose set forth.

2. The combination with the weighted bowl, the cylindrical shank formed integral therewith, of the handle, provided with the socket, and means for securing the shank in the socket so as to permit of the axial movement of the shank and handle with reference to each other, as and for the purpose set forth.

In testimony whereof we have hereunto set our hands in presence of two subscribing witnesses.

WILLIAM HOPPER DODD.
JOSEPH FRANCIS GREER.

Witnesses:
GEORGE S. COURTER,
BARBARA M. GREER.